(12) United States Patent
Yao et al.

(10) Patent No.: US 11,907,481 B2
(45) Date of Patent: *Feb. 20, 2024

(54) TOUCH DISPLAY PANEL, METHOD FOR PREPARING THE SAME, AND DISPLAY DEVICE

(71) Applicant: BOE Technology Group Co., Ltd., Beijing (CN)

(72) Inventors: Qi Yao, Beijing (CN); Chuanxiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,185

(22) Filed: May 27, 2022

(65) Prior Publication Data

US 2022/0291764 A1    Sep. 15, 2022

Related U.S. Application Data

(63) Continuation of application No. 16/837,399, filed on Apr. 1, 2020, now Pat. No. 11,372,505.

(30) Foreign Application Priority Data

Jul. 23, 2019   (CN) .......................... 201910666489.9

(51) Int. Cl.
  *G06F 3/044*   (2006.01)
  *G06F 3/041*   (2006.01)

(52) U.S. Cl.
  CPC ............ *G06F 3/044* (2013.01); *G06F 3/0412* (2013.01); *G06F 2203/04102* (2013.01); *G06F 2203/04103* (2013.01); *G06F 2203/04111* (2013.01)

(58) Field of Classification Search
  None
  See application file for complete search history.

(56) References Cited

U.S. PATENT DOCUMENTS 5,311,337 A * 5/1994 McCartney, Jr. ........................... G02F 1/133514
349/146

2006/0139275 A1   6/2006 Yu
(Continued)

FOREIGN PATENT DOCUMENTS

CN          2727792 Y     9/2005
CN        103219359 A     7/2013
(Continued)

OTHER PUBLICATIONS

Office Action of parent U.S. Appl. No. 16/837,399, dated Mar. 10, 2021, 24 pages.

(Continued)

*Primary Examiner* — Dorothy Harris
(74) *Attorney, Agent, or Firm* — Muncy, Geissler, Olds & Lowe, P.C.

(57) ABSTRACT

The invention provides a touch display panel, a method for preparing the same, and a display device. The touch display panel includes a display module and a touch module that are arranged in a stack, the display module including two conductive layers, an intermediate insulation layer arranged between the two conductive layers and a planarization layer, and the touch module including at least two touch electrodes and a touch insulation layer between the at least two touch electrodes, in which the intermediate insulation layer, the touch insulation layer and the planarization layer are all made of an organic material.

15 Claims, 4 Drawing Sheets

(56) References Cited

U.S. PATENT DOCUMENTS

| | | | | |
|---|---|---|---|---|
| 2006/0170634 | A1* | 8/2006 | Kwak | G09G 3/3233 |
| | | | | 345/92 |
| 2007/0117280 | A1* | 5/2007 | Lee | H01L 27/124 |
| | | | | 438/149 |
| 2007/0230235 | A1* | 10/2007 | Abe | H01L 27/1292 |
| | | | | 257/E27.113 |
| 2008/0278070 | A1* | 11/2008 | Kim | H01L 27/323 |
| | | | | 313/504 |
| 2009/0109172 | A1* | 4/2009 | Lee | G09G 3/344 |
| | | | | 345/107 |
| 2010/0134426 | A1* | 6/2010 | Lee | G09G 3/3225 |
| | | | | 345/173 |
| 2011/0140114 | A1 | 6/2011 | Ko et al. | |
| 2014/0183478 | A1* | 7/2014 | Lee | H10K 50/8426 |
| | | | | 257/40 |
| 2014/0206139 | A1* | 7/2014 | Ni | H01L 29/66969 |
| | | | | 438/104 |
| 2015/0249115 | A1 | 9/2015 | Chen et al. | |
| 2015/0255518 | A1* | 9/2015 | Watanabe | H01L 27/1255 |
| | | | | 257/43 |
| 2015/0311351 | A1* | 10/2015 | Seko | H01L 29/78696 |
| | | | | 257/66 |
| 2017/0069692 | A1* | 3/2017 | Lee | H01L 27/323 |
| 2017/0249889 | A1* | 8/2017 | Wang | G09G 3/2003 |
| 2017/0256594 | A1 | 9/2017 | Bae et al. | |
| 2017/0294491 | A1* | 10/2017 | Jo | G09G 3/2003 |
| 2017/0364187 | A1* | 12/2017 | Zhai | G09F 9/301 |
| 2018/0088260 | A1* | 3/2018 | Jin | G09F 9/302 |
| 2018/0158882 | A1 | 6/2018 | Kim et al. | |
| 2018/0175121 | A1* | 6/2018 | Ji | H01L 51/52 |
| 2019/0006626 | A1 | 1/2019 | Kim et al. | |
| 2019/0043995 | A1* | 2/2019 | Li | H01L 29/78618 |
| 2019/0131589 | A1* | 5/2019 | Matsueda | G09G 3/3225 |
| 2019/0252469 | A1* | 8/2019 | Xiao | H10K 59/122 |
| 2019/0312225 | A1* | 10/2019 | Wang | H10K 71/00 |
| 2021/0043714 | A1 | 2/2021 | Wang et al. | |
| 2021/0210560 | A1 | 7/2021 | Tian et al. | |

FOREIGN PATENT DOCUMENTS

| | | |
|---|---|---|
| CN | 108155210 A | 6/2018 |
| CN | 109742091 A | 5/2019 |
| CN | 109801954 A | 5/2019 |
| KR | 20190081340 A | 7/2019 |

OTHER PUBLICATIONS

Office Action of parent U.S. Appl. No. 16/837,399, dated Nov. 9, 2021, 29 pages.

Final Office Action of parent U.S. Appl. No. 16/837,399, dated Jul. 30, 2021, 25 pages.

Office Action of CN Application No. 2019106664899 and English translation dated Jan. 5, 2023, 10 pages.

Office Action of CN Application No. 201910666489.9 dated Sep. 15, 2023 and English translation, 14 pages.

* cited by examiner

TOUCH DISPLAY PANEL, METHOD FOR PREPARING THE SAME, AND DISPLAY DEVICE

CROSS-REFERENCE TO RELATED APPLICATION

This application is a continuation application of U.S. application Ser. No. 16/837,399, filed on Apr. 1, 2020, which claims a priority to Chinese Patent Application No. 201910666489.9 filed on Jul. 23, 2019, the disclosures of which are incorporated in their entirety by reference herein.

TECHNICAL FIELD

The present disclosure relates to the field of display technology, in particular, to a touch display panel, a method for preparing the same, and a display device.

BACKGROUND

At present, the display panel is rapidly developing from a traditional rigid display to a flexible display. Users begin to looking forward to the launch of display panels or displays that are bentable, foldable, or even rollable.

At present, the normal bending radius of the foldable display panel is relatively large, and is about 5 mm. If the bending radius is further reduced, the display panel may break. In addition, the display panel is creased and warped when it is bent for a long time, and cannot be restored to the state before the bending.

SUMMARY

According to a first aspect, an embodiment of the present disclosure provides a touch display panel, which includes a display module and a touch module that are arranged in a stack, the display module including an active layer, a source-drain layer and an intermediate insulation layer arranged between the active layer and the source-drain layer, and the touch module including at least two touch electrodes and a touch insulation layer between the at least two touch electrodes, in which a pixel unit in the display module comprises a red sub-pixel, a green sub-pixel, and a blue sub-pixel, and at least one of the red sub-pixel, the green sub-pixel and the blue sub-pixel are a polygon with N sides or circle, and the N is an odd integer greater than 4, in which the display module comprises a planarization layer arranged on and is in directly contact with the source-drain layer, wherein the intermediate insulation layer, the touch insulation layer and the planarization layer are all made of an organic material, in which each pixel unit comprises one blue sub-pixel, one red sub-pixel, and two green sub-pixels that are arranged in sequence along a first direction, and two green sub-pixels are arranged along a second direction perpendicular to the first direction, in which an area of one of the two green sub-pixels is less than an area of the blue sub-pixel, and in which the red sub-pixel, the green sub-pixels, and the blue sub-pixel of a first row and the red sub-pixel, the green sub-pixels, and the blue sub-pixel of a second row are arranged in an offset and ordered manner.

Optionally, the organic material includes at least one of silicone resin, acrylic resin, polyacrylic resin, and polyimide resin.

Optionally, a thickness of the intermediate insulation layer is in a range of 1 to 3 microns, and a thickness of the touch insulation layer is in a range of 1 to 3 microns.

Optionally, the touch display panel further includes a thin film encapsulation layer, and the thin film encapsulation layer is arranged between the intermediate insulation layer and the touch insulation layer.

Optionally, the touch display panel further includes a color filter, and the color filter is arranged on a side of the touch insulation layer away from the thin film encapsulation layer and reused as a circular polarizer.

Optionally, a thickness of the planarization layer is equal or greater than 2.5 microns and less than 3 microns.

Optionally, the display module includes an anode, and the planarization layer is arranged on a side of the anode away from the touch module for planarizing the anode.

In a second aspect, an embodiment of the present disclosure further provides a display device including the touch display panel as described above.

According to a third aspect, an embodiment of the present disclosure further provides a method for preparing a touch display panel, including: forming a display module, the display module including an active layer, a source-drain layer and an intermediate insulation layer arranged between the active layer and the source-drain layer; and forming a touch module on the display module, the touch module including at least two touch electrodes and a touch insulation layer between the at least two touch electrodes; in which a pixel unit in the display module comprises a red sub-pixel, a green sub-pixel, and a blue sub-pixel, and at least one of the red sub-pixel, the green sub-pixel and the blue sub-pixel are a polygon with N sides or circle, and the N is an odd integer greater than 4; in which the display module comprises a planarization layer arranged on and is in directly contact with the source-drain layer; in which the intermediate insulation layer, the touch insulation layer and the planarization layer are all made of an organic material; in which each pixel unit comprises one blue sub-pixel, one red sub-pixel, and two green sub-pixels that are arranged in sequence along a first direction, and two green sub-pixels are arranged along a second direction perpendicular to the first direction; in which an area of one of the two green sub-pixels is less than an area of the blue sub-pixel; and in which the red sub-pixel, the green sub-pixels, and the blue sub-pixel of a first row and the red sub-pixel, the green sub-pixels, and the blue sub-pixel of a second row are arranged in an offset and ordered manner.

Optionally, the method further includes forming a thin film encapsulation layer for covering the display module before the forming the touch module on the display module; in which the forming the touch module on the display module includes forming the touch module on the thin film encapsulation layer; and in which the method further includes: forming a color filter on the touch module after the forming the touch module on the display module.

BRIEF DESCRIPTION OF THE DRAWINGS

In order to illustrate the technical solutions of the present disclosure in a clearer manner, the drawings for illustrating the embodiments of the present disclosure will be briefly described hereinafter. Obviously, the following drawings merely relate to some embodiments of the present disclosure. Based on these drawings, a person skilled in the art may obtain the other drawings without any creative effort.

DETAILED DESCRIPTION

The technical solutions in the embodiments of the present disclosure will be described hereinafter in conjunction with the drawings in the embodiments of the present disclosure in a clear and complete manner. Obviously, the following embodiments relate to a part of, rather than all of, the embodiments of the present disclosure. Based on these embodiments, a person skilled in the art may, without any creative effort, obtain the other embodiments, which also fall within the scope of the present disclosure.

In the related art, the intermediate insulation layer and the touch insulation layer in the touch display panel are both made of an inorganic material. Due to the poor flexibility of the inorganic material, the flexibility of the touch display panel is relatively poor, resulting in a relatively large bending radius of the touch display panel, and the problem of creasing and warping when it is bent for a long time.

In view of the above problems, the present disclosure provides a touch display panel, a method for preparing the same, and a display device including the touch display panel. The touch display panel or the touch display device is capable of solve the problems that the foldable display device in the related art has a relatively large bending radius, and creasing and warping may occur when it is bent for a long time.

An embodiment of the present disclosure provides a touch display panel, including a display module and a touch module that are arranged in a stack. The display module includes two conductive layers and an intermediate insulation layer arranged between the two conductive layers. The touch module includes at least two touch electrodes and a touch insulation layer between the at least two touch electrodes. At least one of the intermediate insulation layer and the touch insulation layer is made of an organic material.

Figure 1A:
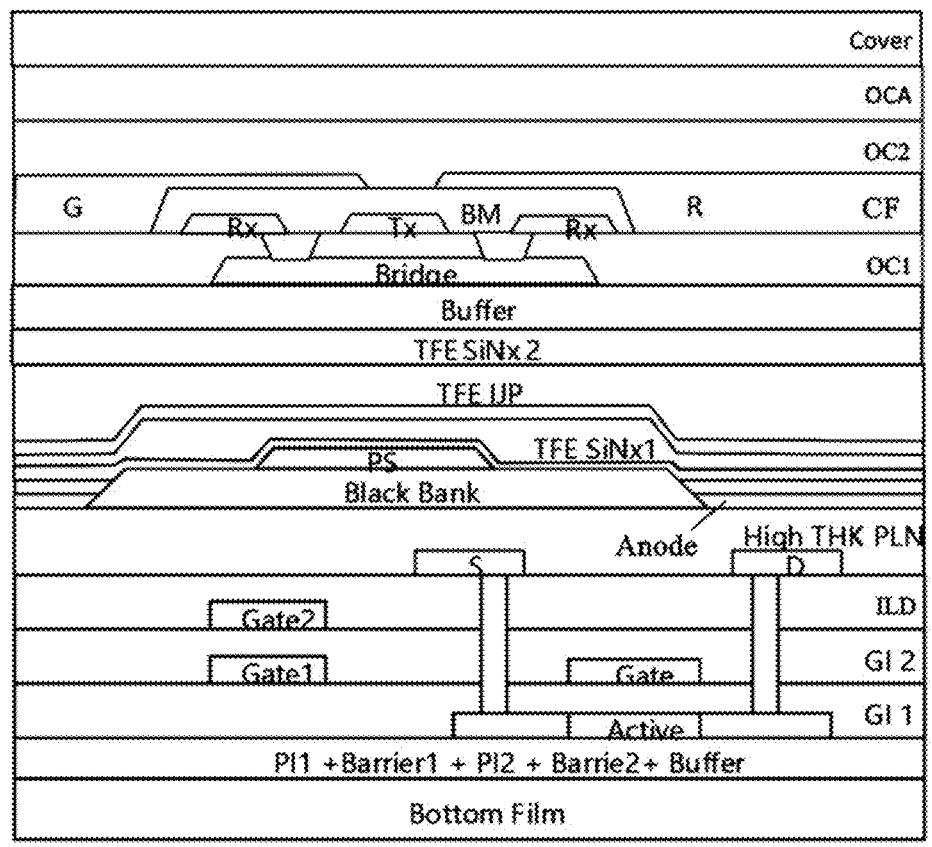
FIG. 1a is a cross-sectional view showing a touch display panel according to an embodiment of the present disclosure.
Figure 1B:
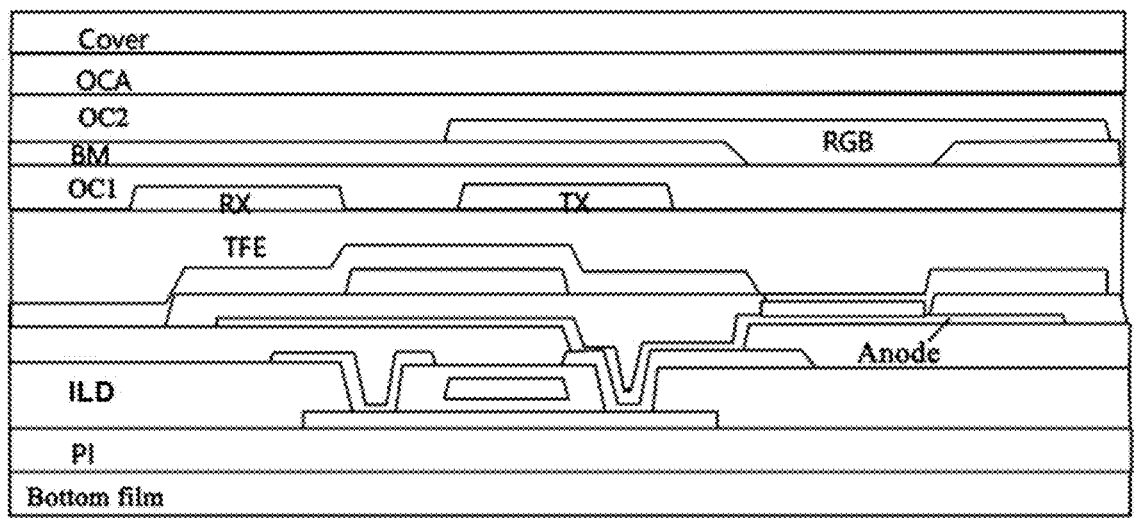
FIG. 1b is a cross-sectional view showing a touch display panel according to another embodiment of the present disclosure.

FIG. 1a is a touch display panel according to an embodiment of the present disclosure, which includes a mutual-capacitive touch module and a display module. As shown in FIG. 1a, the touch display panel includes: a base film or substrate (Bottom Film); a composite layer including a polyimide layer 1 (PI1), a barrier layer 1 (Barrier1), a polyimide layer 2 (PI2), a barrier layer 2 (Barrier2) and a buffer layer (Buffer); a gate insulation layer including a first gate insulation layer (GI1) and a second gate insulation layer (GI2); a gate electrode layer including a gate layer (Gate1) formed on the first gate insulation layer (GI1) and a gate layer (Gate2) formed on the second gate insulation layer (GI2); an active layer (Active); a source-drain layer (S and D); a high-thickness planarization layer (High THK PLN); a black bank (Black Bank); a post spacer layer (PS); a thin film encapsulation layer (TFE) including a first silicon nitride layer (TFE SiNx1), an inkjet printing organic layer (TFE IJP), and a second silicon nitride layer (TFE SiNx2); a buffer layer (Buffer); a touch insulation layer (OC1); an electrode layer including a lateral electrode (Tx) and a vertical electrode (Rx); a black matrix layer (BM), a color filter layer (CF), an organic insulation layer (OC2); a planarization layer (OCA) and a cover (Cover). FIG. 1b is a touch display panel according to an embodiment of the present disclosure, which includes a self-capacitive touch module and a display module. The self-capacitive touch display panel shown in FIG. 1b is slightly different from the mutual-capacitive touch display panel shown in FIG. 1a, in which the slight difference is mainly in the arrangement of the electrode layer, and other layer structures are basically same as those of FIG. 1a.

Specifically, the two touch display panels shown in FIG. 1a and FIG. 1b both include a display module and a touch module that are arranged in a stack. The display module includes two conductive layers and an intermediate insulation layer (i.e., ILD in FIG. 1a and FIG. 1b) arranged between the two conductive layers. The touch module includes at least two touch electrodes and a touch insulation layer (i.e., OC1 in FIG. 1a and FIG. 1b) for forming an insulation between the at least two touch electrodes. At least one of the intermediate insulation layer and the touch insulation layer is made of an organic material.

In the embodiment of the present disclosure, since the organic material is more flexible than the inorganic material, the constituent material of at least one of the intermediate insulation layer and the touch insulation layer in the touch display panel is replaced from the inorganic material to the organic material, thereby improving the flexibility of the touch display panel, and further reducing the bending radius of the touch display panel and avoiding the occurrence of creasing and warping. Therefore, the technical solution provided by the present disclosure is capable of improving the flexibility of the touch display panel and improving the display performance of the touch display panel.

The display module includes a plurality of functional film layers that cooperates with each other to achieve a display function. For example, such functional film layer includes a gate layer, a gate insulation layer, an active layer, a metal layer, etc. The plurality of functional film layers includes at least two conductive layers and an intermediate insulation layer arranged between two adjacent conductive layers. The intermediate insulation layer is configured to achieve an insulation between two adjacent conductive layers.

The touch module includes a plurality of functional film layers that cooperates with each other to achieve a touch function. For example, such functional film layer includes a touch sensing layer, a signal trace layer, etc. The plurality of functional film layers includes a plurality of touch electrodes uniformly distributed in a display region, and a touch insulation layer arranged between the plurality of touch electrodes. The touch insulation layer is configured to form an insulation between the plurality of touch electrodes.

As shown in FIG. 1a, the touch display panel includes a mutual-capacitive touch module and a display module. The mutual-capacitive touch module includes a touch insulation layer OC1, and the display module includes an intermediate insulation layer ILD. A lateral electrode Tx and a vertical electrode Rx (and a bridge) are respectively arranged on both sides of the touch insulation layer. A capacitor is formed where the two sets of electrodes cross, that is, the two sets of electrodes form the two poles of the capacitor. When a finger touches the touch module, the coupling between the two electrodes proximate to the touch point is affected, thereby changing the capacitance between the two electrodes. When the mutual capacitance is detected, the transverse electrodes emit excitation signals in sequence, and all the longitudinal electrodes receive signals at the same time, so that the capacitances of the intersections of all the transverse and longitudinal electrodes, that is, the capacitances of all capacitors in the entire touch module, can be obtained. According to the data of capacitance change in the touch module, the coordinates of each touch point can be calculated. If the touch module has multiple touch points at the same time, the true coordinates of each touch point can also be calculated.

As shown in FIG. 1b, the touch display panel includes a self-capacitive touch module and a display module. The mutual-capacitive touch module includes a touch insulation layer OC1, and the display module includes an intermediate insulation layer ILD. A lateral electrode Tx and a vertical electrode Rx are respectively provided on one side of the touch insulation layer, and these electrodes form a capacitor with the ground, respectively. When a finger touches the touch module, the capacitance of the finger will be superimposed on the capacitor. During touch detection, the touch module sequentially detects the horizontal and vertical electrode arrays respectively, determines the horizontal and vertical coordinates respectively according to the change in capacitance before and after the touch, and then combines them into planar touch coordinates. The self-capacitance scanning manner is equivalent to projecting the touch points on the touch module to the X-axis and Y-axis directions respectively, then calculating the coordinates in the X-axis and Y-axis directions, and finally combining the coordinates of the touch points.

The deposition manners for the above intermediate insulation layer and the touch insulation layer are different in the cases that they are originally made of an inorganic material and that they are made of an organic material. When the intermediate insulation layer and the touch insulation layer are made of an organic material, they can be formed by coating.

The touch display panel may further include a cover proximate to a side of user operation. The cover is configured to protect the touch module and the display module below. The touch module is located between the display module and the cover.

Optionally, the organic material may include an organic resin. Optionally, the organic material may include at least one of silicone resin, acrylic resin, polyacrylic resin, and polyimide resin.

The thinner the intermediate insulation layer and the touch insulation layer, the thinner the thickness of the touch display panel. This is conducive to improving the bending performance of the touch display panel, thereby reducing the bending radius of the touch display panel. Optionally, a thickness of the intermediate insulation layer is in a range of 1 to 3 microns, and a thickness of the touch insulation layer is in a range of 1 to 3 microns.

Optionally, the touch display panel further includes a thin film encapsulation layer arranged between the intermediate insulation layer and the touch insulation layer. Optionally, the thin film encapsulation layer may be a three-layer stacked structure of inorganic material/organic material/ inorganic material, or even a four-layer or a repeating multi-layer stacked structure of inorganic material/organic material/inorganic material/organic material. The three-layer or multi-layer stacked structure can allow the thin film encapsulation layer to effectively block the aggression of water and oxygen to the flexible display substrate, thereby ensuring the encapsulation performance of the encapsulation structure.

In this embodiment, a thin film encapsulation layer is arranged between the display module and the touch insulation layer, that is, located in a middle position of the display panel. During the bending process, the outermost film layer is subjected to the greatest tensile force, the innermost film layer has the highest bending degree, and the middle portion of the film layer has a moderate tensile force and bending degree. The thin film encapsulation layer can be better protected from being broken by setting the thin film encapsulation layer in the middle position, and thus the problem of poor display caused by the breakage of thin film encapsulation layer is avoided, the reliability of the touch display device is improved.

Optionally, the touch display panel further includes a color filter. The color filter is arranged on a side of the touch insulation layer away from the encapsulating and also reused as a circular polarizer.

In the related art, a circular polarizer is generally used to reduce the amount of ambient light emitted from the light emitting surface after it enters the touch display panel and is reflected by the internal structure of the touch display panel light. A circular polarizer usually uses cellulose triacetate (TAC) and cyclic olefin polymer (COP) as the substrate, so that they have a relatively poor bending resistance. In addition, when the bending radius is less than 2 millimeters, breakage easily occurs, and creasing and warping (Curl value=10) are generated when it is bent for a long time and cannot return to the original state.

In this embodiment, the color filter is also capable of reducing the amount of ambient light emitted from the light emitting surface after it enters the touch display panel and is reflected by the internal structure of the touch display panel light, so that is can replace a circular polarizer. In addition, the color filter is more flexible than the circular polarizer, so it is capable of improving the bending resistance of the touch display panel.

In addition, the thickness of a circular polarizer is usually much higher than the thickness of a color filter. Replacing the circular polarizer with a color filter is capable of greatly reducing the thickness of the touch display panel, thereby further improving the bending resistance of the touch display panel.

Figure 2:
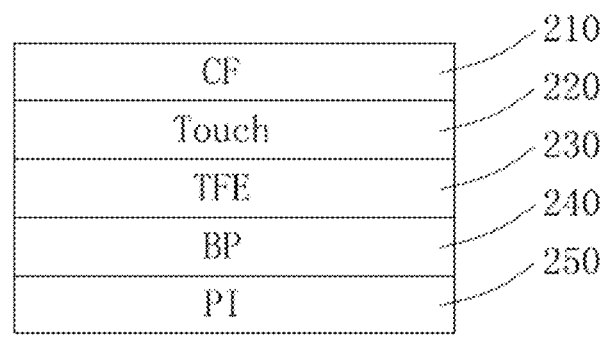
FIG. 2 is a schematic view showing a part of film layers of a touch display panel according to another embodiment of the present disclosure.

In this embodiment, as shown in FIG. 2, the film layer structure of the touch display panel includes a color filter (CF) 210, a touch module 220, a thin film encapsulation layer (TFE) 230, a backplane (BP) 240 and a polyimide layer (PI) 250 that are arranged in sequence from the top to the bottom. The touch module 220 includes a touch insulation layer, such as the OC1 layer in FIG. 1a or FIG. 1b. BP 240 and PI 250 belong to display modules including an intermediate insulation layer, such as the ILD layer in FIG. 1a or FIG. 1b.

Optionally, the pixel unit in the display module includes a red sub-pixel, a green sub-pixel, and a blue sub-pixel. The red sub-pixel, the green sub-pixel and the blue sub-pixel are each a polygon with N sides or circle, and the N is greater than or equal to 4. Optionally, the N-polygon structure is a quadrilateral structure, a pentagonal structure, a hexagonal structure, a heptagonal structure, or an octagonal structure.

Figure 3:
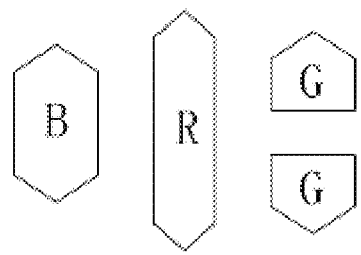
FIG. 3 is a schematic view showing a pixel structure of a touch display panel according to the related art.

After a color filter on Encap (COE), instead of the circular polarizer, is arranged on the thin film encapsulation layer, the display image of the touch display panel usually has a problem of color separation. This is because the sub-pixels of different colors are originally designed to have different shapes and different sizes in order to form white light together with the circular polarizer, as shown in FIG. 3. After replacing the circular polarizer, sub-pixels of different shapes and sizes may cause light diffraction effects, resulting in color separation.

Figure 4:
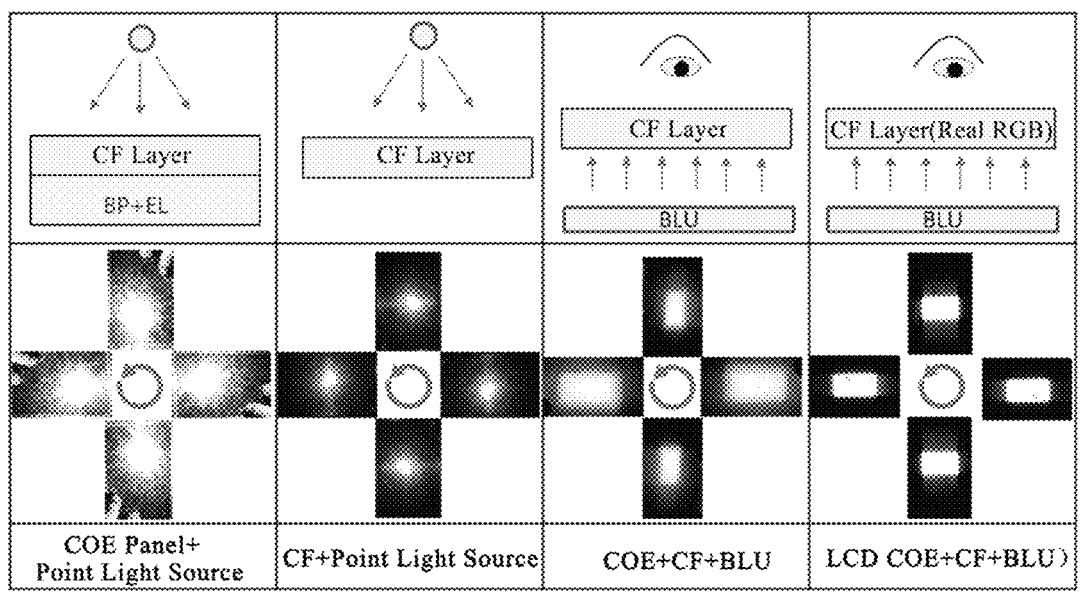
FIG. 4 is a schematic view showing a color separation phenomenon of a touch display panel of according to an embodiment of the present disclosure.

As shown in FIG. 4, FIGS. (a), (b), and (c) are figures showing the relevant display panel (COE panel+point light source), the color filter (CF+point light source), and another display panel (COE+CF+backlight source); and FIG. (d) shows an improved display panel according to an embodiment of the present disclosure, which uses LCD COE, CF, backlight, and designs the pixel shape to improve the color separation phenomenon. As can be seen from FIG. 4, regardless of the point light source and the surface light source (for example, the back light unit (BLU)), viewing the touch display panel at different angles can find different degrees of color separation. However, as shown in FIG. 4(d), a significant improvement in color separation can be observed when a touch display panel designed with an improved pixel shape according to the present disclosure is used.

Figure 5A:
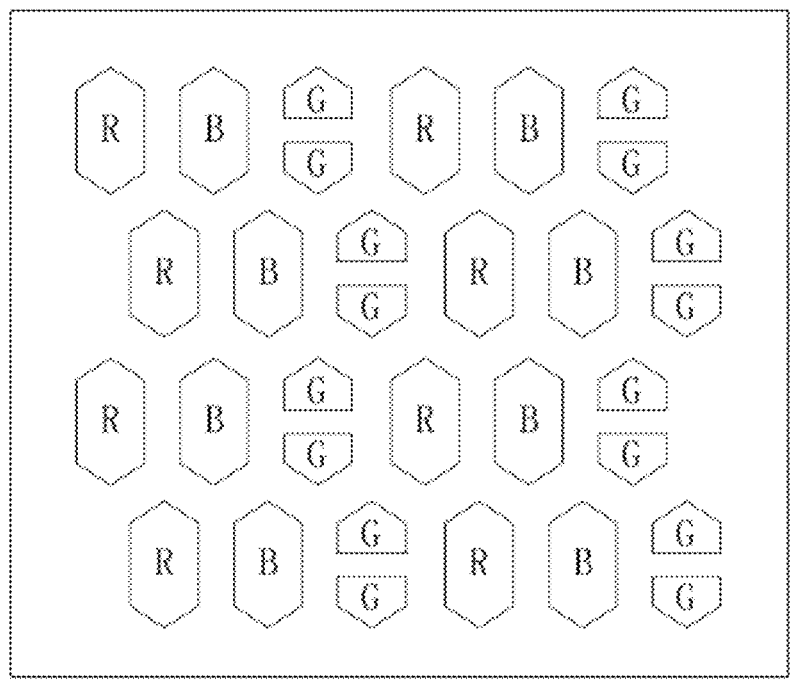
FIG. 5a is a schematic view showing a pixel unit in a touch display panel according to an embodiment of the present disclosure.
Figure 5B:
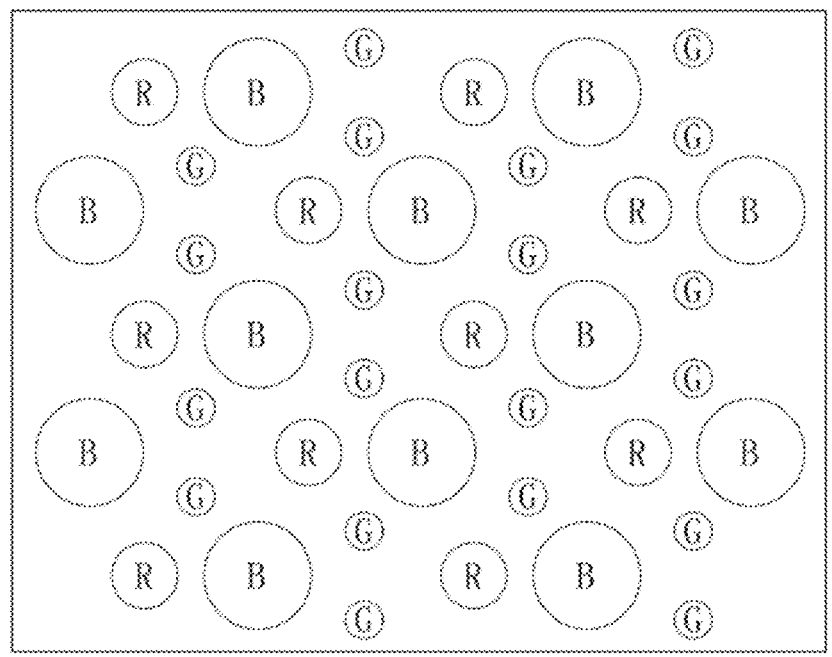
FIG. 5b is a schematic view showing a pixel unit in a touch display panel according to another embodiment of the present disclosure.
Figure 5C:
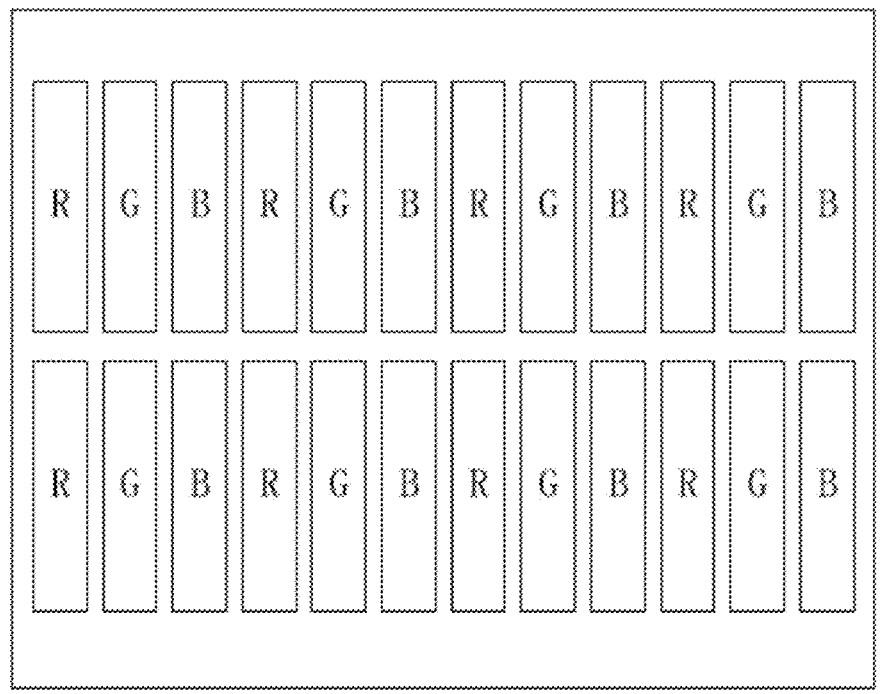
FIG. 5c is a schematic view showing a pixel unit in a touch display panel according to another embodiment of the present disclosure.

In this embodiment, designing the red sub-pixel, the green sub-pixel, and the blue sub-pixel into N-polygon structures (as shown in FIG. 5a and FIG. 5c) or a circular structure (as shown in FIG. 5b) is capable of reducing the diffraction effect of light between sub-pixels of different colors. Optionally, the N-polygon structure may be a pentagon, a hexagon, a heptagon, an octagonal structure, a long rectangular structure, or the like, which is not limited herein. Optionally, the N-polygon structure may be a quadrangle, a pentagon, or a hexagon.

By comparing FIG. 5 and FIG. 3, increasing the width of the red sub-pixel may achieve the effect of reducing color separation. Optionally, the size (e.g., the width) of the blue and red sub-pixels in FIG. 5a is not particularly limited, and the sizes of them may be different or same. Preferably, the sizes and shapes of the blue and red sub-pixels in FIG. 5a are exactly the same. Optionally, each pixel unit includes one blue sub-pixel, one red sub-pixel, and two green sub-pixels that are arranged in sequence along a first direction, and two green sub-pixels are arranged along a second direction perpendicular to the first direction; and an area of one of the two green sub-pixels is less than an area of the blue sub-pixel. Optionally, the R, G, and B pixels of the first row and the R, G, and B pixels of the second row are arranged in an offset and ordered manner to provide the resolution of the touch display panel and to improve the color separation phenomenon.

Optionally, each pixel unit includes one red sub-pixel, two green sub-pixels, and one blue sub-pixel. Optionally, the red and blue sub-pixels are arranged in a first direction, the two green sub-pixels are arranged in a second direction (the second direction is perpendicular to the first direction), and the connection line between the centers of the red sub-pixel and the blue sub-pixel 130 intersects with the connection line between the centers of the two green sub-pixels 120. That is, the two green sub-pixels are located on both sides of the connection line between the center of the red sub-pixel and the center of the blue sub-pixel, respectively.

Optionally, the display module includes an anode, and a planarization layer arranged on a side of the anode away from the touch module for planarizing the anode, and a thickness of the planarization layer is greater than 2.5 microns. Optionally, the thickness of the planarization layer is 2.8 microns, 3 microns, 3.5 microns, 4 microns, or 5 microns. Optionally, the thickness of the planarization layer is not greater than 10 microns.

The reason why color separation will occur in COE technology also lies in that the uneven anode causes non-directional reflection of light of different colors on the anode. In this embodiment, increasing the thickness of the planarization layer is capable of improving the flatness of the anode formed on the planarization layer. As shown in the first and second columns in FIG. 6, when the planarization layer (PLN) is a plurality of layers, the flatness of the anode formed on the planarization layer can be improved. Therefore, the degree of non-directional reflection of light of different colors on the anode is reduced, thereby achieving the effect of reducing color separation.

Optionally, the planarization layer is made of an organic resin material. Optionally, the planarization layer the planarization layer is made of at least one of silicone resin, acrylic resin, polyacrylic resin, and polyimide.

Figure 6:
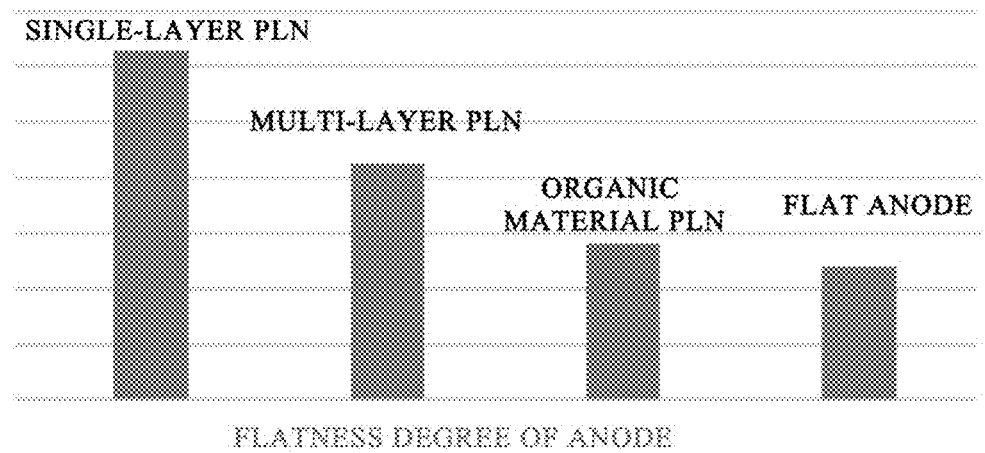
FIG. 6 is a schematic view showing the degree of the influence of the different composition of the planarization layer on the color separation phenomenon in a touch display panel according to an embodiment of the present disclosure.

As shown in the second and third columns in FIG. 6, when the multi-layer planarization layer is made of the organic material, not only can the flexibility of the planarization layer be improved, but also the flatness of the anode formed on the planarization layer can be improved. Therefore, the planarization layer made of organic material reduces the degree of non-directional reflection of light of different colors on the anode, thereby achieving the effect of reducing color separation. The fourth column of flat anodes in FIG. 6 show the effect on the color separation phenomenon when the anode is in an ideal flat state. Therefore, when an organic material is used to prepare the multi-layer planarization layer, the softness of the touch display panel and the color separation problem of the touch display panel can be greatly improved.

In a second aspect, an embodiment of the present disclosure further provides a display device including the touch display panel as described above.

Optionally, the display device may be a displayer, a mobile phone, a tablet computer, a television, a wearable electronic device, a navigation display device, or the like.

In a third aspect, an embodiment of the present disclosure further provides a method for preparing a touch display panel, including: forming a display module, the display module including two conductive layers and an intermediate insulation layer arranged between the two conductive layers; and forming a touch module on the display module, the touch module including at least two touch electrodes and a touch insulation layer between the at least two touch electrodes, in which at least one of the intermediate insulation layer and the touch insulation layer is made of an organic material.

In the embodiment of the present disclosure, since the organic material is more flexible than the inorganic material, the constituent material of at least one of the intermediate insulation layer and the touch insulation layer in the touch display panel is replaced from the inorganic material to the organic material, thereby improving the flexibility of the touch display panel, and further reducing the bending radius of the touch display panel and avoiding the occurrence of creasing and warping. Therefore, the technical solution provided by the present disclosure is capable of improving the flexibility of the touch display panel and improving the display performance.

The display module includes a plurality of functional film layers that cooperates with each other to achieve a display function. For example, such functional film layer includes a gate layer, a gate insulation layer, an active layer, a metal layer, etc. The plurality of functional film layers includes at least two conductive layers and an intermediate insulation layer arranged between two adjacent conductive layers. The intermediate insulation layer is configured to achieve an insulation between two adjacent conductive layers.

The touch module includes a plurality of functional film layers that cooperates with each other to achieve a touch function. For example, such functional film layer includes a touch sensing layer, a signal trace layer, etc. The plurality of functional film layers includes a plurality of touch electrodes uniformly distributed in a display region, and a touch insulation layer arranged between the plurality of touch electrodes. The touch insulation layer is configured to form an insulation between the plurality of touch electrodes.

When the intermediate insulation layer and the touch insulation layer are made of an organic material, they can be formed by coating.

The touch display panel may further include a cover proximate to a side of user operation, in which the cover configured to protect the touch module and the display module below. The touch module is located between the display module and the cover.

Optionally, the conductive layer or the touch electrode may be formed by evaporation, sputtering, printing, or the like. Optionally, the organic material may include an organic resin. Optionally, the organic material may include at least one of silicone resin, acrylic resin, polyacrylic resin, polyimide, and an organic resin. Optionally, the organic layer may be formed by a coating method.

Optionally, the method further includes: forming a thin film encapsulation layer for covering the display module before the forming the touch module on the display module.

Optionally, the forming the touch module on the display module includes forming a touch module on the thin film encapsulation layer.

Optionally, the method further includes: forming a color filter on the touch module after the forming the touch module on the display module.

The thin film encapsulation layer may be a three-layer or multi-layer stacked structure of inorganic material/organic material/inorganic material. The three-layer stacked structure can allow the thin film package layer to effectively block the aggression of water and oxygen to the flexible display substrate, thereby ensuring the package performance of the package structure.

A thin film encapsulation layer is arranged between the display module and the touch insulation layer, that is, located in a middle position of the display panel. During the bending process, the outermost film layer is subjected to the greatest tensile force, the innermost film layer has the highest bending degree, and the middle portion of the film layer has a moderate tensile force and bending degree. Setting the thin film encapsulation layer in the middle position can better protect the thin film encapsulation layer from being broken. This avoids the problem of poor display caused by the breakage of thin film encapsulation layer, thereby improving the reliability of the touch display device.

Optionally, the color filter can be made by a single patterning process. In this embodiment, the color filter is also capable of reducing the amount of ambient light emitted from the light emitting surface after it enters the touch display panel and is reflected by the internal structure of the touch display panel light, so that is can replace a circular polarizer. In addition, the color filter is more flexible than the circular polarizer, so it is capable of improving the bending resistance of the touch display panel.

In addition, the thickness of a circular polarizer is usually much higher than the thickness of a color filter. Replacing the circular polarizer with a color filter is capable of greatly reducing the thickness of the touch display panel, thereby further improving the bending resistance of the touch display panel.

In this embodiment, as shown in FIG. 2, the touch display panel includes a color filter (CF) 110, a touch module 120, a thin film encapsulation layer (TFE) 130, a backplane (BP) 140 and a polyimide layer (PI) 150 that are arranged in order from the top to the bottom. The touch module 120 includes a touch insulation layer, such as the OC1 layer in FIG. 1a or FIG. 1b. BP and PI belong to the display module 140, including an intermediate insulation layer, such as the ILD layer in FIG. 1a or FIG. 1b.

Unless otherwise defined, technical terms or scientific terms used herein have the normal meaning commonly understood by one skilled in the art in the field of the present disclosure. The words "first", "second", and the like used in the present disclosure does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

It will be understood that when an element, such as a layer, film, region, or substrate, is referred to as being "on" or "under" another element, the element may be directly "on" or "under" another element, or there may be an intermediate element.

The embodiments of the present disclosure have been described above with reference to the accompanying drawings, but the present disclosure is not limited to the above specific embodiments, and the above specific embodiments are merely illustrative, and not restrictive. Without departing from the scope of the present disclosure and the scope of protection of the claims, a person skilled in the art can made many variations in light of the present disclosure, all of which fall into the protection of the present disclosure.

What is claimed is:

1. A touch display panel, comprising a display module and a touch module that are arranged in a stack,
wherein the display module comprises an active layer, a source-drain layer and an intermediate insulation layer arranged between the active layer and the source-drain layer, and the touch module comprises at least two touch electrodes and a touch insulation layer between the at least two touch electrodes;
wherein a pixel unit in the display module comprises a red sub-pixel, a green sub-pixel, and a blue sub-pixel, and at least one of the red sub-pixel, the green sub-pixel and the blue sub-pixel are a polygon with N sides or circle, and the N is an odd integer greater than 4,
wherein the display module comprises a planarization layer arranged on and is in direct contact with the source-drain layer, wherein the intermediate insulation layer, the touch insulation layer and the planarization layer are all made of an organic material, and a thickness of the planarization layer is equal or greater than 2.5 microns and less than 3 microns, wherein each pixel unit comprises one blue sub-pixel, one red sub-pixel, and two green sub-pixels that are arranged in sequence along a first direction, and two green sub-pixels are arranged along a second direction perpendicular to the first direction, wherein an area of one of the two green sub-pixels is less than an area of the blue sub-pixel, wherein the red sub-pixel, the green sub-pixels, and the blue sub-pixel of a first row and the red sub-pixel, the green sub-pixels, and the blue sub-pixel of a second row are arranged in an offset and ordered manner, and wherein the touch display panel further comprises a color filter, and the color filter is arranged on a side of the touch insulation layer away from the thin film encapsulation layer and reused as a circular polarizer.

2. The touch display panel of claim 1, wherein the organic material comprises at least one of silicone resin, acrylic resin, polyacrylic resin, and polyimide resin.

3. The touch display panel of claim 1, wherein a thickness of the intermediate insulation layer is in a range of 1 to 3 micrometers, and a thickness of the touch insulation layer is in a range of 1 to 3 micrometers.

4. The touch display panel of claim 1, wherein the touch display panel further comprises a thin film encapsulation layer, and the thin film encapsulation layer is arranged between the intermediate insulation layer and the touch insulation layer.

5. The touch display panel of claim 1, wherein the display module comprises an anode, and the planarization layer is arranged on a side of the anode away from the touch module for planarizing the anode.

6. A display device, comprising the touch display panel of claim 1.

7. The display device of claim 6, wherein the organic material comprises at least one of silicone resin, acrylic resin, polyacrylic resin, and polyimide resin.

8. The display device of claim 6, wherein a thickness of the intermediate insulation layer is in a range of 1 to 3 micrometers, and a thickness of the touch insulation layer is in a range of 1 to 3 micrometers.

9. The display device of claim 6, wherein the touch display panel further comprises a thin film encapsulation layer, and the thin film encapsulation layer is arranged between the intermediate insulation layer and the touch insulation layer.

10. The display device of claim 6, wherein the display module comprises an anode, and the planarization layer is arranged on a side of the anode away from the touch module for planarizing the anode.

11. A method for preparing a touch display panel, comprising:
forming a display module, the display module comprising an active layer, a source-drain layer and an intermediate insulation layer arranged between the active layer and the source-drain layer; and
forming a touch module on the display module, the touch module comprising at least two touch electrodes and a touch insulation layer between the at least two touch electrodes;

wherein a pixel unit in the display module comprises a red sub-pixel, a green sub-pixel, and a blue sub-pixel, and at least one of the red sub-pixel, the green sub-pixel and the blue sub-pixel are a polygon with N sides or circle, and the N is an odd integer greater than 4, wherein the display module comprises a planarization layer arranged on and is in direct contact with the source-drain layer, and a thickness of the planarization layer is equal or greater than 2.5 microns and less than 3 microns, wherein the intermediate insulation layer, the touch insulation layer and the planarization layer are all made of an organic material, wherein each pixel unit comprises one blue sub-pixel, one red sub-pixel, and two green sub-pixels that are arranged in sequence along a first direction, and two green sub-pixels are arranged along a second direction perpendicular to the first direction, wherein an area of one of the two green sub-pixels is less than an area of the blue sub-pixel, wherein the red sub-pixel, the green sub-pixels, and the blue sub-pixel of a first row and the red sub-pixel, the green sub-pixels, and the blue sub-pixel of a second row are arranged in an offset and ordered manner, and wherein the touch display panel further comprises a color filter, and the color filter is arranged on a side of the touch insulation layer away from the thin film encapsulation layer and reused as a circular polarizer.

12. The method of claim 11, wherein the method further comprises forming a thin film encapsulation layer for covering the display module before the forming the touch module on the display module;
wherein the forming the touch module on the display module comprises forming the touch module on the thin film encapsulation layer; and
wherein the method further comprises forming a color filter on the touch module after the forming the touch module on the display module.

13. The method of claim 11, wherein the organic material comprises at least one of silicone resin, acrylic resin, polyacrylic resin, and polyimide resin.

14. The method of claim 11, wherein a thickness of the intermediate insulation layer is in a range of 1 to 3 micrometers, and a thickness of the touch insulation layer is in a range of 1 to 3 micrometers.

15. The method of claim 11, wherein the touch display panel further comprises a thin film encapsulation layer, and the thin film encapsulation layer is arranged between the intermediate insulation layer and the touch insulation layer.

* * * * *